United States Patent
Hara et al.

(10) Patent No.: US 6,203,744 B1
(45) Date of Patent: Mar. 20, 2001

(54) METHOD FOR PRODUCING MOLDED ARTICLE OF THERMOPLASTIC RESIN

(75) Inventors: Takahisa Hara; Masahito Matsumoto; Nobuhiro Usui; Shigeyoshi Matubara, all of Osaka; Kazuo Hieda, Hyogo, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 08/386,190

(22) Filed: Feb. 9, 1995

Related U.S. Application Data

(63) Continuation of application No. 08/041,359, filed on Apr. 1, 1993, now abandoned, which is a continuation of application No. 07/729,201, filed on Jul. 12, 1991, now abandoned.

(30) Foreign Application Priority Data

Jul. 13, 1990 (JP) .................................................. 2-186290

(51) Int. Cl.⁷ .............................. B29C 45/14; B29C 45/04
(52) U.S. Cl. ........................................ 264/266; 264/328.7
(58) Field of Search .................................. 264/45.4, 46.6, 264/259, 266, 275, 316, 328.7, 328.8, 509, 511, 513, 299, 319

(56) References Cited

U.S. PATENT DOCUMENTS

| | | | |
|---|---|---|---|
| 2,666,230 | 1/1954 | Sherman | 425/577 |
| 4,076,788 | 2/1978 | Ditto | 264/255 |
| 4,091,057 * | 5/1978 | Weber | 264/328.1 |
| 4,184,835 | 1/1980 | Talbot | 425/577 |

FOREIGN PATENT DOCUMENTS

| | | | |
|---|---|---|---|
| 0107431 | 5/1984 | (EP) . | |
| 0333198 | 9/1989 | (EP) . | |
| 333198 * | 9/1989 | (EP) | 264/46.6 |
| 2329434 | 5/1977 | (FR) . | |
| 2154499 | 9/1985 | (GB) . | |
| 59-101322 | 6/1984 | (JP) . | |
| 60-031929 | 2/1985 | (JP) . | |
| 1-235613 | 9/1989 | (JP) . | |
| 3-236917 | 10/1991 | (JP) . | |

* cited by examiner

*Primary Examiner*—Angela Ortiz
(74) *Attorney, Agent, or Firm*—Birch, Stewart, Kolasch & Birch, LLP

(57) ABSTRACT

A molded article of a thermoplastic resin with good appearance which may have a skin material is produced by providing upper and lower molds having a product part-molding section and a non-product part-molding section, supplying a melt of a thermoplastic resin in a cavity of the molds or a space between the skin material and either one of the upper and lower molds through a resin melt passage which is formed in a wall of one of the molds and has an opening for supplying the melt in the non-product part-molding section when a clearance of the cavity is larger than a thickness of a finally produced article, closing the molds to effect press molding, cooling the molds.

20 Claims, 3 Drawing Sheets

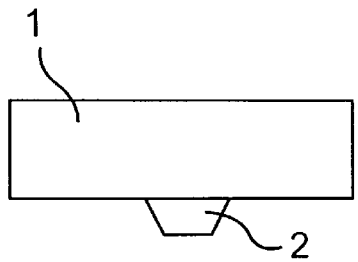
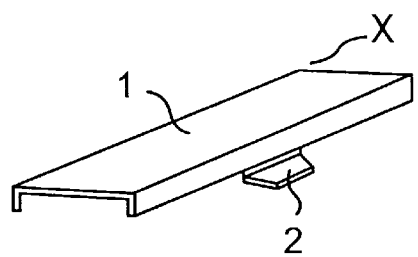
FIG. 1
FIG. 2
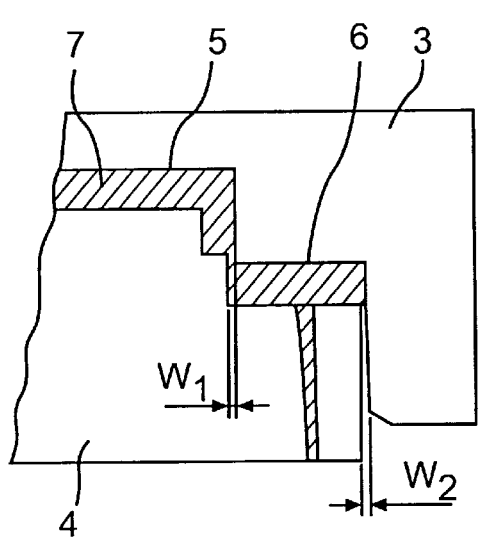
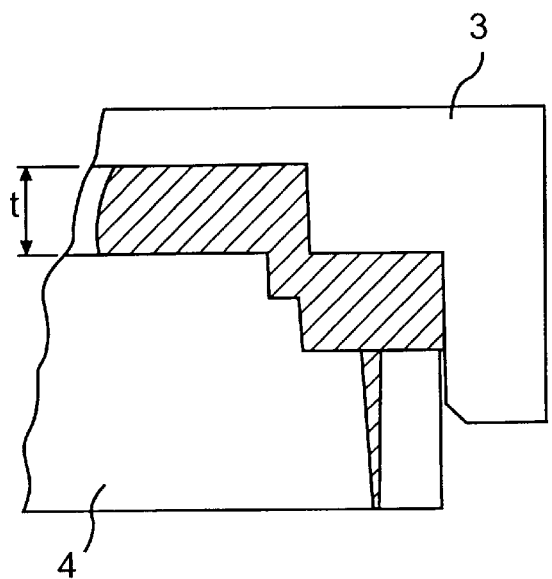
FIG. 3
FIG. 4

METHOD FOR PRODUCING MOLDED ARTICLE OF THERMOPLASTIC RESIN

This application is a continuation of application Ser. No. 08/041,359 filed on Apr. 1, 1993, now abandoned, which was a continuation of application Ser. No. 07/729,201 filed on Jul. 12, 1991, now abandoned.

BACKGROUND OF THE INVENTION

1. Field of the Invention

The present invention relates to a method for producing a molded article of a thermoplastic resin. In particular, the present invention relates to a method for effectively producing a molded article which consists of a thermoplastic resin or comprises a thermoplastic resin core and a skin material layer thereon without the deterioration of appearance.

2. Description of the Related Art

In the production of a molded article of a thermoplastic resin, various improvements have been proposed to improve quality of the molded articles and increase production efficiency. For example, Japanese Patent Kokai Publication No. 101322/1984 discloses supply of a resin melt through a resin conduit formed in a wall of a mold attached to a lower platen, namely a lower mold. Japanese Patent Kokai Publication No. 31929/1985 discloses supply of a resin melt through a resin conduit formed in a wall of a lower mold and closing the mold at a specific timing. However, both methods cannot completely prevent uneven gloss or small wrinkles which are so-called cold marks around the resin conduit having an opening on an inner wall of the mold. To suppress the formation of the cold marks, it may be contemplated to increase a resin temperature and/or a mold temperature. However, a time period from the finish of molding to the removal of the molded article from the mold becomes longer, so that a molding cycle is prolonged and in turn the productivity is worsened.

A multilayer molded article having a skin layer on the thermoplastic resin molded article to improve ornamental properties and functions of the article is widely used in various fields such as automobile interior panels or electric appliances. One of the methods for producing such multilayer molded article is disclosed in Japanese Patent Kokai Publication No. 235613/1989. In the conventional methods for producing the multilayer molded article including this method, since a high temperature resin melt is continuously supplied from a position close to the skin material, a part of the skin material is subjected to the high temperature for a longer time than other parts and then deteriorated and deformed so that various defects such as crush, unevenness or breakage of the skin material appear.

SUMMARY OF THE INVENTION

One object of the present invention is to provide a method for producing a molded article of a thermoplastic resin having no or little cold marks.

Another object of the present invention is to provide a method for producing a multilayer molded article comprising a thermoplastic resin core and a skin material without damaging the skin material.

According to a first aspect of the present invention, there is provided a method for producing a molded article of a thermoplastic resin, comprising providing upper and lower molds having a product part-molding section and a non-product part-molding section, supplying a melt of a thermoplastic resin in a cavity of said molds through a resin melt passage which is formed in a wall of one of said molds and has an opening for supplying said melt in said non-product part-molding section when a clearance of said cavity is larger than a thickness of a finally produced article, closing the molds to effect press molding, cooling the molds.

According to a second aspect of the present invention, there is provided a method for producing a multilayer molded article comprising a resin core and a skin material provided on said resin body, which method comprises providing upper and lower molds having a product part-molding section and a non-product part-molding section, placing a skin material between said upper and lower molds, supplying a resin melt in a space defined by said skin material and one of said upper and lower molds through a resin melt passage which is formed in a wall of said one mold and has an opening for supplying said melt in said non-product part-molding section when a clearance of said cavity is larger than a thickness of a finally produced article, closing the molds to effect press molding, and cooling the molds.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1 and 2 are a plan view and a perspective view of an example of a molded article to be produced by the method of the present invention, FIGS. 3, 4 and 9 are partial cross sectional views of a mold for producing a molded article of a thermoplastic resin according to the present invention.

DETAILED DESCRIPTION OF THE INVENTION

Figure 5:
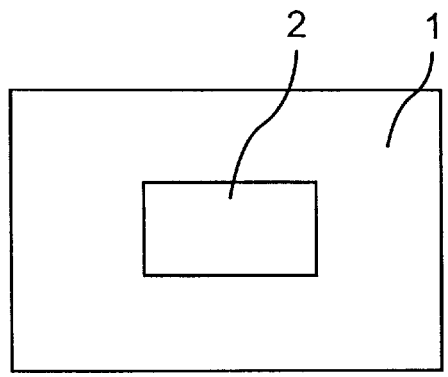
FIG. 5 is a plan view of another example of a molded article to be produced by the method of the present invention.

As the thermoplastic resin to be used in the method of the present invention, any thermoplastic resin which is conventionally used in compression molding, injection molding or extrusion may be used. Examples of the thermoplastic resin are polypropylene, polyethylene, polystyrene, polymethyl methacrylate, polycarbonate, polyacrylamide, acrylonitrile-styrene-butadiene block copolymers, polyamide.

As the core resin, in addition to the above thermoplastic resin, a foamable or non-foamable plastics such as thermoplastic elastomers (e.g. ethylene-propylene block copolymers or styrene-butadiene block copolymers) may be used.

To the resin, conventional additives such as fillers (e.g. organic fillers or glass fibers), pigments, lubricants, antistatic agents or stabilizers may be added.

As the skin material, any of conventional materials may be used. Examples of the skin material are fabrics, nonwoven fabrics, nets of metals, fibers, thermoplastic resins, paper, metal foils, sheets or films of thermoplastic resins and thermoplastic elastomers. Further, the skin material may be decorated with uneven designs such as emboss, printing or coloring. As the skin material, a foam of a thermoplastic resin (e.g. polyolefins or polyvinyl chloride), a thermosetting resin (e.g. polyurethane) or a rubber (e.g. cic-1,4-polybutadiene or ethylene-propylene copolymers) may be used. In addition, a laminate of two or more sheets of the same skin material or different skin materials which are bonded together with, for example, an adhesive can be used. When the skin material is used, at least a part of the material can be preheated so as to adjust a tensile stress or elongation of the material.

In the present invention, the term "product part" intends to mean a part of the molded article which is useful as a final product, and the term "non-product part" intends to mean a part of the molded article which is useless as a final product, and is cut off or hidden behind the "product part" in use.

The present invention will be explained further in detail by making reference to the accompanying drawings.

FIGS. 1 and 2 are a plan view and a perspective view of an example of the molded article produced by the method of the present invention. This molded article comprises a product part 1 and a non-product part 2, which may be cut off or folded back behind the product part 1.

The molded article of FIGS. 1 and 2 has only one non-product part, though it may have two or more non-product parts.

FIG. 3 is a partial cross sectional view of a mold to be used for molding the article of FIGS. 1 and 2, which sectional view includes a non-product part-molding section. The mold of FIG. 3 comprises an upper mold 3 and a lower mold 4, which together form a product part-molding section 5 and a non-product part-molding section 6. FIG. 3 shows a step of molding after a resin melt 7 is supplied and then the upper and lower molds 3, 4 are completely closed. In the present invention, at this stage, a clearance $W_1$ at a boundary between the product part-molding section and the non-product part-molding section is preferably from 0.03 to 1.5 mm. When the clearance $W_1$ is too large, a thickness of a part bridging the product part and the non-product part becomes too thick so that it is difficult to cut off or fold back the non-product part. When this clearance is too small, the resin melt which is firstly supplied in the non-product part-molding section does not flow into the product part-molding section at a sufficient rate.

A clearance $W_2$ around the outermost periphery of the lower mold is preferably from 0.01 to 0.07 mm. When this clearance is too large, the supplied resin melt tends to be squeezed out through the clearance.

One opening for supplying the resin melt is present in a non-product part-molding section, while two or more openings for supplying the resin melt may be present in a non-product part-molding section.

As shown in FIG. 4, the resin melt is supplied when the cavity clearance t is in the range between (C+0.1) mm to 50 mm where C is a cavity clearance when the molding is finished. When the resin melt is supplied, a relationship between the resin supply and the cavity clearance is precisely controlled by adjusting the mold closing speed at 0 to 30 mm/sec. When a transparent resin (e.g. polymethyl methacrylate or polycarbonate) is used as the thermoplastic resin, the cavity clearance t is preferably in the range between (C+0.1) mm to (C+7) mm when the resin is supplied for the purpose of producing a molded article having no cold mark.

The final mold closing and shaping can be done during or after the supply of the resin melt, and the molded article is removed from the mold after cooling.

The non-product part 2 is present outside the product part 1 as shown in FIG. 1, though the former may be present inside the latter as shown in FIG. 5.

Now, the method for producing a multilayer molded article comprising the resin core and the skin material will be explained.

This method is substantially the same as the method described above except that the skin material is provided between the upper and lower molds and the resin melt is supplied between the skin material and either one of the upper and lower molds.

Figure 6:
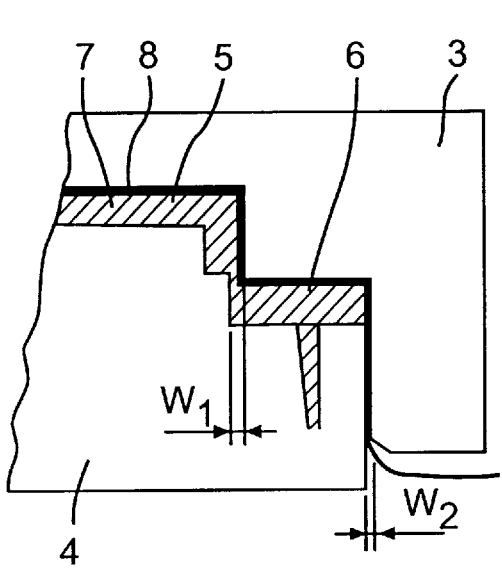
FIGS. 6 and 7 are partial cross sectional views of a mold for producing a multilayer molded article according to the present invention.

A skin material shown in FIG. 6 can be fixed to the mold with a fixing means which is disclosed in, for example, Japanese Patent Kokai Publication No. 235613/1989. In this arrangement, the skin material is supported by pins provided on a top edge of one of the molds.

In case of the production of the multilayer molded article, when the molds are completely closed, the clearance $W_1$ at the boundary between the product part-molding section and the non-product part-molding section is preferably a sum of a thickness of the skin material (mm) and (0.1 to 1.0) mm. Herein, the thickness of the skin material is intended to mean a thickness measured under a load of 60 kg/cm$^2$.

Figure 7:
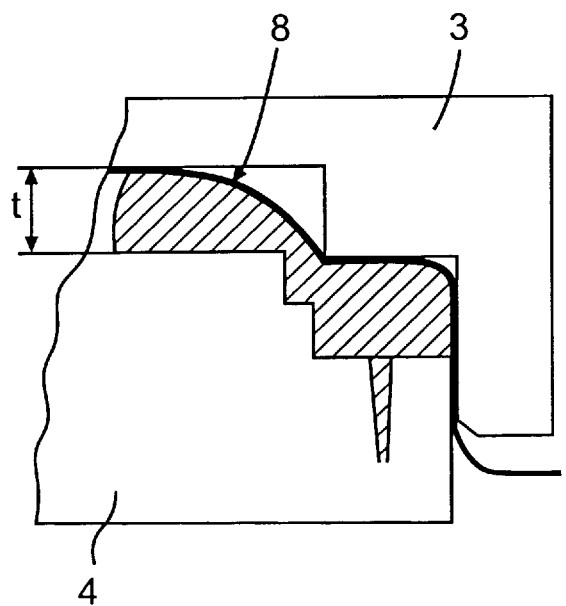

FIG. 7 corresponds to FIG. 4.

Preferably, the resin melt for the resin body is supplied between the skin material and one of the male and female molds while temporarily stopping the closing action of the mold(s) or adjusting a closing rate at 30 mm/sec. or less when a cavity clearance between the molds is in a range between (C+100) mm and (C+5) mm.

PREFERRED EMBODIMENTS OF THE INVENTION

The present invention will be explained further in detail by following Examples.

A "warp" of the molded article is evaluated by placing the molded article of FIG. 2 on a flat plate after cutting off the non-product part, pushing down a corner X and measuring a height of a corner a lower edge of which is most highly raised among other three corners. The warp is expressed in terms of such height.

A melt flow rate (MFR) is measured under the following conditions:

MFR of polypropylene: At 230° C. under a load of 2.16 kg according to JIS K 6758.

MFR of polymethyl methacrylate: At 230° C. under a load of 3.8 kg according to ASTM D 1238.

MFR of polycarbonate: At 300° C. under a load of 1.2 kg according to ASTM D 1238.

EXAMPLE 1

A box shape molded article as shown in FIGS. 1 and 2 having a length of 440 mm, a width of 55 mm, a height of 20 mm and a wall thickness of 2.5 mm was press molded with a mold having a resin supply opening in a non-product part-molding section of a lower mold.

Polypropylene (Sumitomo Noblen AZ 564 manufactured by Sumitomo Chemical Co., Ltd.) was used as a thermoplastic resin. After adjusting a resin temperature at 220° C. and a mold temperature at 40° C., supply of the resin melt was started when the clearance (t) between the upper and lower molds was 5 mm and finished when the clearance (t) was 3 mm. During the supply of the resin melt, the upper mold was lowered to close the molds.

In this molding process, a molding cycle was 30 seconds, and the product part of the molded article had good appearance.

COMPARATIVE EXAMPLE 1

In the same manner as in Example 1 but using a mold having a resin supply opening in the product part-molding section of the lower mold, a molded article was produced. The article had nonuniform gloss around a surface part corresponding to the resin supply opening.

COMPARATIVE EXAMPLE 2

In the same manner as in Example 1 but using a mold having a resin supply opening in the product part-molding section of the lower mold and adjusting the resin temperature at 265° C. and the mold temperature at 90° C., a molded article was produced. The article did not have nonuniform gloss around a surface part corresponding to the resin supply opening. However, a molding cycle in this process was prolonged to 45 seconds which was 15 seconds longer than that in Example 1.

EXAMPLE 2

In the same manner as in Example 1 but using polymethyl methacrylate (Sumipex-B MHO manufactured by Sumitomo Chemical Co., Ltd.) as a thermoplastic resin and adjusting the resin temperature at 250° C. and the mold temperature at 60° C., a molded article was produced. A molding cycle in this process was 35 seconds, and the molded article had good appearance.

COMPARATIVE EXAMPLE 3

In the same manner as in Example 1 but using a mold having a resin supply opening in the product part-molding section of the lower mold, using polymethyl methacrylate as used in Example 2 and adjusting the resin temperature at 280° C. and the mold temperature at 60° C., a molded article was produced. The article had nonuniform gloss in a ring form around a surface part corresponding to the resin supply opening. A molding cycle was 45 seconds.

EXAMPLE 3

A box shape molded article as shown in FIGS. 1 and 2 having a length of 440 mm, a width of 55 mm, a height of 20 mm and a wall thickness of 2.5 mm and a skin material laminated on its surface was press molded with a mold having a resin supply opening in a non-product part-molding section of a lower mold.

Polypropylene (Sumitomo Noblen AZ 564 manufactured by Sumitomo Chemical Co., Ltd.) was used as a thermoplastic resin, and a laminate sheet having a total thickness of 3 mm and consisting of a polyvinyl chloride sheet and a polypropylene foam layer (expansion ratio of 25) was used as a skin material. After adjusting a resin temperature at 190° C. and a mold temperature at 30° C., supply of the resin melt was started when the clearance (t) between the upper and lower molds was 20 mm, and finished when the clearance (t) was 5 mm. During the supply of the resin melt, the upper mold was lowered to close the molds.

The product part of the molded article had good appearance.

COMPARATIVE EXAMPLE 4 zIn the same manner as in Example 3 but using a mold having a resin supply opening in the product part-molding section of the lower mold, a multilayer molded article was produced. The foam layer of the skin material around a surface part corresponding to the resin supply opening was molten, and the skin material surface was uneven.

EXAMPLE 4

A box shape molded article as shown in FIGS. 1 and 2 having a length of 440 mm, a width of 55 mm, a height of 20 mm and a wall thickness of 3 mm was press molded with a mold having a resin supply opening in a non-product part-molding section of a lower mold.

Polymethyl methacrylate (Sumipex-B MMO manufactured by Sumitomo Chemical Co., Ltd., Melt flow index of 0.6 g/10 minutes) was used as a thermoplastic resin. After adjusting a resin temperature at 257° C., a female mold temperature at 70° C. and a male mold temperature of 60° C., the upper mold was lowered to a clearance (t) of 8 mm and once stopped. Then, supply of the resin melt was started. Just before finishing the supply of the resin melt, the mold closing was restarted, and the resin melt was pressed under 2 a clamping force of 100 kg/cm². After cooling, the molded article was removed from the molds.

The product part of the molded article had good appearance and very small warp.

EXAMPLES 5–8

In the same manner as in Example 4 but changing the kinds of the thermoplastic resins and the resin supply conditions as shown in Table 1, a molded article was produced. Each molded article had good appearance and very small warp.

COMPARATIVE EXAMPLES 5 AND 6

Polymethyl methacrylate shown in Table 1 was injection molded at a resin temperature of 277° C., a female mold temperature of 75° C. and a male mold temperature of 65° C. under a clamping force of 800 kg/cm² to obtain a molded article.

Though the molded article had good appearance, it had large warp.

TABLE 1

| Example No. | Resin | Mold closing rate (mm/sec) | Clearance at start of resin melt supply (mm) | Clearance at finish of resin melt supply (mm) | Temp. of female mold (° C.) | Temp. of male mold (° C.) | Temp. of resin | Molded article Thickness (mm) | Appearance | Warp (mm) | Note |
|---|---|---|---|---|---|---|---|---|---|---|---|
| 4 | MMO[1] | 0 | 8 | 8 | 70 | 60 | 257 | 3 | Good | <1 | |
| 5 | MMO[1] | 0 | 6 | 6 | 70 | 65 | 285 | 3 | Good | <1 | |
| 6 | MMO[1] | 0 | 3.2 | 3.2 | 75 | 65 | 257 | 3 | Good | <1 | |
| 7 | MMO[1] | 15 | 10 | 4 | 75 | 65 | 257 | 3 | Good | <1 | |
| 8 | MHO[2] | 15 | 10 | 4 | 60 | 50 | 257 | 3 | Good | <1 | |
| C. 5 | MMO[1] | 0 | 3 | 3 | 75 | 65 | 277 | 3 | Good | 4 | Injection molding |
| C. 6 | MHO[2] | 0 | 3 | 3 | 75 | 65 | 277 | 3 | Good | 4 | Injection molding |

Note:
[1]MMO = Sumipex B-MMO (polymethyl methacrylate having MFR of 0.6 g/10 min. manufactured by Sumitomo Chemical Co., Ltd.)
[2]MHO = Sumipex B-MHO (polymethyl methacrylate having MFR of 2.0 g/10 min. manufactured by Sumitomo Chemical Co., Ltd.)

EXAMPLES 9 AND 10

Figure 8:
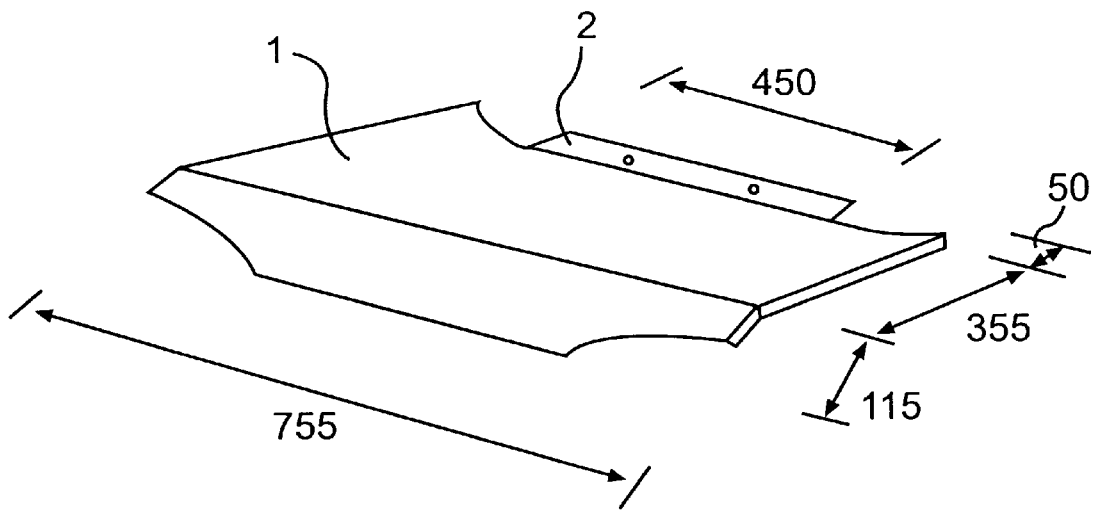
FIG. 8 is a perspective view of a further example of a molded article to be produced by the method of the present invention.
Figure 9:
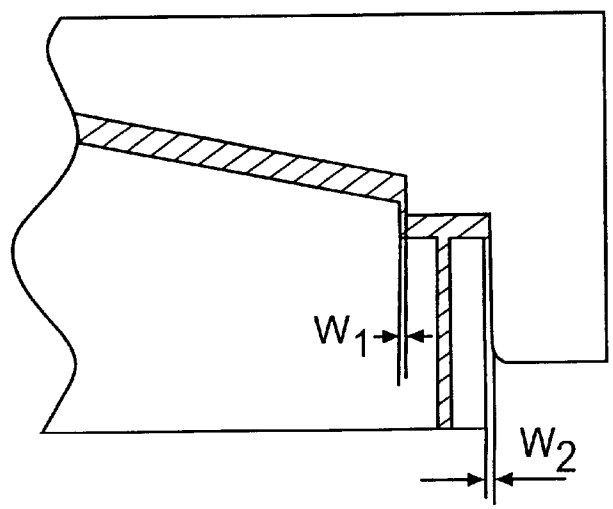

A molded article as shown in FIG. 8 having sizes (mm) indicted in FIG. 8 was press molded with a mold having a resin supply opening in a non-product part-molding section of a lower mold.

Polycarbonate (Calibre 300-22 manufactured by Sumitomo Naugatuck Co., Ltd., MFR of 22 g/10 min.) was used as a resin. Under the resin supply conditions shown in Table 2, the resin was supplied, the molds were closed and the article-was molded. After cooling, the molded article was removed from the molds.

The product part of the molded article had good appearance.

EXAMPLES 11–14

In the same manner as in Example 9 but changing the kinds of the resins and the resin melt supply conditions as shown in Table 3, a molded article was produced.

The product part of the molded article had good appearance.

COMPARATIVE EXAMPLE 7

In the same manner as in Example 11 but changing the resin melt supply conditions as shown in Table 3, a molded article was produced. The molded article had poor appearance due to formation of ring marks and cold marks.

COMPARATIVE EXAMPLE 8

Polypropylene shown in Table 3 was injection molded at a resin temperature of 240° C., a female mold temperature of 60° C. and a male mold temperature of 55° C. to obtain a molded article.

Though the molded article had good appearance, it had large warp.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 2

| Example No. | Resin | Mold closing rate (mm/sec) | Clearance at start of resin melt supply (mm) | Clearance at finish of resin melt supply (mm) | Temp. of female mold (° C.) | Temp. of male mold (° C.) | Temp. of resin | Molded article Thickness (mm) | Appearance | Warp (mm) |
|---|---|---|---|---|---|---|---|---|---|---|
| 9 | 300-22[1] | 0 | 4 | 4 | 70 | 65 | 290 | 2 | Good | <1 |
| 10 | 300-22[1] | 10 | 10 | 6 | 70 | 65 | 290 | 2 | Good | <1 |

Note:
[1]Kaliver 300-22 manufactured by Sumitomo Naugatuck Co., Ltd., MFR of 22 g/10 min.)

TABLE 3

| Example No. | Resin | Resin melt supply conditions | | | | | | Molded article | | | Note |
|---|---|---|---|---|---|---|---|---|---|---|---|
| | | Mold closing rate (mm/sec) | Clearance at start of resin melt supply (mm) | Clearance at finish of resin melt supply (mm) | Temp. of female mold (° C.) | Temp. of male mold (° C.) | Temp. of resin | Thickness (mm) | Appearance | Warp (mm) | |
| 11 | AH568[1] | 0 | 4 | 4 | 60 | 55 | 240 | 2.5 | Good | <1 | |
| 12 | AH568[1] | 0 | 15 | 15 | 60 | 55 | 240 | 2.5 | Good | <1 | |
| 13 | AH568[1] | 10 | 20 | 5 | 60 | 55 | 240 | 2.5 | Good | <1 | |
| 14 | AX568[2] | 0 | 4 | 4 | 60 | 55 | 240 | 2.5 | Good | <1 | |
| C. 7 | AH568[1] | 10 | 55 | 20 | 60 | 55 | 240 | 2.5 | 3) | <1 | |
| C. 8 | AH568[1] | 0 | 2.5 | 2.5 | 60 | 55 | 240 | 2.5 | Good | 5 | Injection molding |

Note:
[1] Sumitomo Noblen AH 568 (polypropylene manufactured by Sumitomo Chemical Co., Ltd., MFR of 3.0 g/10 min.)
[2] Sumitomo Noblen AX 568 (polypropylene manufactured by Sumitomo Chemical Co., Ltd., MFR of 65 g/10 min.)
3) Formation of ring marks and cold marks.

What is claimed is:

1. A method for producing a molded article of a thermoplastic resin, comprising;
   providing upper and lower molds having a product part-molding section and a non-product part-molding section, the upper and lowers molds being movable toward and away from one another such that whenever a cavity shape of the product part-molding section changes, a cavity shape of the non-product part-molding section changes,
   supplying a melt of a thermoplastic resin in a cavity of said molds through a resin melt passage which is formed in a wall of one of said molds and has an opening for supplying said melt in said non-product part-molding section when a pre-closing clearance of said cavity is larger than a thickness of a finally produced article,
   closing the molds to effect press molding,
   forming a post-closing clearance between said upper mold and said lower mold at a boundary between said product part-molding section and said non-product part-molding section, the melt being flowable from the non-product part-molding section to the product part-molding section when the molds are closed through the post-closing clearance between the upper mold and the lower mold, and cooling the molds.

2. The method according to claim 1, wherein the post-closing clearance between said upper mold and said lower mold at the boundary between said product part-molding section and said non-product part-molding section is from 0.03 to 1.5 mm when said upper and lower molds are closed.

3. A method for producing a multilayer molded article comprising a resin core and a skin material provided on said resin body, which method comprises providing upper and lower molds having a product part-molding section and a non-product part-molding section, placing a skin material between said upper and lower molds, supplying a resin melt in a space defined by said skin material and one of said upper and lower molds through a resin melt passage which is formed in a wall of said one mold and has an opening for supplying said melt in said non-product part-molding section when a pre-closing clearance of said cavity is larger than a thickness of a finally produced article, closing the molds to effect press molding, forming a post-closing clearance between said upper mold and said lower mold at a boundary between said product part-molding section and said non-product part molding section, said post-closing clearance being wider than a thickness of the skin material, and cooling the molds.

4. The method according to claim 3, wherein the post-closing clearance between said upper mold and said lower mold at the boundary between said product part-molding section and said non-product part-molding section is from the thickness of said skin material+0.1 mm to the thickness of said skin material+1.0 mm when said upper and lower molds are closed.

5. The method according to claim 2, further comprising providing a mold post-closing clearance between an outer edge of the upper mold and an outer edge of the lower mold.

6. The method according to claim 5, wherein the mold post-closing clearance is from 0.01 to 0.07 mm when the upper and lower molds are closed.

7. The method according to claim 5, further comprising locating the outer edges of the upper mold and lower mold outwardly of the boundary between said product part-molding section and said non-product part-molding section.

8. The method according to claim 1, further comprising providing a mold post-closing clearance between an outer edge of the upper mold and an outer edge of the lower mold.

9. The method according to claim 8, wherein the mold post-closing clearance is from 0.01 to 0.07 mm when the upper and lower molds are closed.

10. The method according to claim 4, further comprising providing a mold post-closing clearance between an outer edge of the upper mold and an outer edge of the lower mold.

11. The method according to claim 10, wherein the mold post-closing clearance is from 0.01 to 0.07 mm when the upper and lower molds are closed.

12. The method according to claim 10, further comprising locating the outer edges of the upper mold and lower mold outwardly of the boundary between said product part-molding section and said non-product part-molding section.

13. The method according to claim 3, further comprising providing a mold post-closing clearance between an outer edge of the upper mold and an outer edge of the lower mold.

14. The method according to claim 13, wherein the mold post-closing clearance is from 0.01 to 0.07 mm when the upper and lower molds are closed.

15. The method according to claim 3, wherein the step of placing the skin material comprises positioning the skin material in both the product part-molding section and the non-product part-molding section.

16. The method according to claim 3, further comprising providing the skin material with a predetermined thickness and wherein the first post-closing clearance between the upper mold and the lower mold at the boundary between the product part-molding section and the non-product part-molding section is larger than the predetermined thickness of the skin material.

17. The method according to claim 1, further comprising the steps of preventing cold marks in response to the step of supplying the melt of resin to the non-product part-molding section.

18. The method according to claim 3, further comprising the steps of preventing cold marks in response to the step of supplying the melt of resin to the non-product part-molding section.

19. The method according to claim 5, further comprising the steps of preventing cold marks in response to the step of supplying the melt of resin to the non-product part-molding section.

20. The method according to claim 3, wherein the upper and lower molds are movable toward and away from each other such that whenever a cavity shape of the product part-molding section changes, a cavity shape of the non-product part-molding section changes.

* * * * *